UNITED STATES PATENT OFFICE.

THOMAS BYRNE, OF BATON ROUGE, LOUISIANA.

IMPROVEMENT IN MODES OF APPLYING SULPHUROUS ACID TO CANE-JUICE.

Specification forming part of Letters Patent No. 29,860, dated September 4, 1860.

*To all whom it may concern:*

Be it known that I, THOMAS BYRNE, of the city and parish of Baton Rouge, and State of Louisiana, have invented a new and useful Process of Clarifying Sugar-Juices; and I do hereby declare that the following is a full, clear, and exact description of the same.

My process is intended to avoid the formation of sulphite of lime in the sugar-juices, and at the same time to secure a more effective action from the acid and lime. To accomplish these results I first treat the sugar-cane juices with water saturated with sulphurous-acid gas, and then with lime in the following manner: The water is saturated with sulphurous-acid gas by any of the known methods now in use for saturating milk of lime (which milk of lime, when saturated, is sold as bisulphite of lime of commerce) to the density of 4° Baumé, and then applied to the sugar-juices as they flow from the mills in proportion of one gallon to five hundred gallons of juice. As soon as the acid is mixed with the sugar-cane juice fermentation ceases and the bleaching process commences; and when said juices have become heated by the regular boiling process to about 200° Fahrenheit, at which temperature the acid will have passed out, lime in such proportions as a practical sugar-maker shall see fit should be introduced into the detached sugar-cane juices for the purposes of coagulating the impurities contained in the said juices, and thus insuring the rising of all foreign matter to the top of the said juices. The skimming process is next performed, and by the time the juices shall have arrived at a density of 20° Baumé the lime and foreign matter will have been removed. At this stage another dose of water saturated with sulphurous-acid gas is to be applied in order to remove any color which may have been imparted to the juices by the action of the lime. As baryta, strontia, and magnesia possess decided alkaline properties, I may, in performing with my process, find it advantageous to use one or the other of these earths in place of lime, and therefor I do not restrict myself to the use of lime.

In all methods with which I am familiar of applying sulphurous-acid gas, whether applied directly to sugar-juices, as practiced by Badoux, Stewart, and Brashear, or as in the form of bisulphite of lime, as commonly practiced, or in solution in water, as practiced by Strolle, the acid and lime are present in said juices at the same time, and the neutral salt, sulphite of lime, is formed and remains in the sugar to its great detriment, whereas in my process but one of the agents is present in the sugar-juices at the same time, and it is in this important respect that my process differs from all other processes.

Referring to Stolle's process, patented in England in 1838, it is clear that he intended the lime and the acid to be present at one and the same time in the juices, for he speaks of the precipitation of the lime by the acid. Referring to Melson's experiments in Europe previously to 1845, in the treatment of the juices of beet-root, it is seen that, after a series of unsuccessful attempts in the direct application of sulphurous-acid gas to said juices, he found it necessary to substitute bisulphite of lime; and referring to Pierre Joseph Badoux's processes for the treatment of sugar-juices, filed at the Patent Office and conditionally assigned to myself and John Hill, it will be seen that his process is for the direct application of sulphurous-acid gas to sugar-juices, and for this reason: After various experiments we abandoned our claim on account of the impracticability of measuring the quantity or quality of the gas.

I am aware that John Scoffer obtained a patent for clarifying sugar-juices, and claims the removing of lead from said juices by sulphurous-acid gas, and in specification of said John Scoffer he applies sulphurous acid gas, next heats said juices to 180° Fahrenheit, and then applies lime; but, as appears in United States Reports, page 368, that this refers to a second application of lime, for lime being applied before the sulphurous-acid gas is applied sulphite of lime will be formed in said juices without any reference to the degree of heat subsequently applied. I do not claim his method; but What I do claim is—

A method by which I treat sugar-cane juices with sulphurous-acid gas and lime, or sulphurous-acid gas and either of the earths—viz., baryta, magnesia, or strontia—so that no sulphite of lime or sulphite of any of the above-mentioned bases shall be formed in said cane-juices, as set forth.

THOS. BYRNE.

Witnesses:
GOODWIN Y. AT LEE,
ROBT. W. FENWICK.